United States Patent
Pietrobon et al.

(10) Patent No.: US 11,270,578 B2
(45) Date of Patent: Mar. 8, 2022

(54) METHOD, APPARATUS, AND SYSTEM FOR DETECTING ROAD CLOSURES BASED ON PROBE ACTIVITY

(71) Applicant: HERE GLOBAL B.V., Eindhoven (NL)

(72) Inventors: Davide Pietrobon, Berkeley, CA (US); Andrew Lewis, Berkeley, CA (US); Gavin Heverly-Coulson, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 243 days.

(21) Appl. No.: 16/148,746

(22) Filed: Oct. 1, 2018

(65) Prior Publication Data
US 2020/0105134 A1    Apr. 2, 2020

(51) Int. Cl.
*G08G 1/01* (2006.01)
*G06F 16/29* (2019.01)
*G06F 16/9537* (2019.01)
*G01C 21/34* (2006.01)

(52) U.S. Cl.
CPC ............ *G08G 1/0133* (2013.01); *G06F 16/29* (2019.01); *G06F 16/9537* (2019.01); *G08G 1/012* (2013.01); *G01C 21/3415* (2013.01)

(58) Field of Classification Search
CPC ..... G01C 21/32; G01C 21/3415; G06F 16/29; G06F 16/9537; G08G 1/0112; G08G 1/012; G08G 1/0133; G08G 1/0141
See application file for complete search history.

(56) References Cited

U.S. PATENT DOCUMENTS

| | | | |
|---|---|---|---|
| 7,755,509 B2* | 7/2010 | Bespalov | G08G 1/0104 340/905 |
| 9,240,123 B2 | 1/2016 | Stenneth | |
| 9,818,295 B2 | 11/2017 | Kestling et al. | |
| 2016/0275404 A1* | 9/2016 | Abraham | G06Q 10/20 |
| 2017/0061787 A1* | 3/2017 | Lorkowski | G01C 21/32 |
| 2017/0098372 A1* | 4/2017 | Eilertsen | G08G 1/096741 |
| 2019/0088117 A1* | 3/2019 | Jin | G08G 1/0133 |

FOREIGN PATENT DOCUMENTS

WO    2017009466 A1    1/2017

OTHER PUBLICATIONS

Wang et al., "Road Traffic Anomaly Detection via Collaborative Path Inference From GPS Snippets", Article, Published Mar. 9, 2017, Sensors 2017, vol. 17, Issue 3, pp. 1-21.

(Continued)

*Primary Examiner* — Anshul Sood
(74) *Attorney, Agent, or Firm* — Ditthavong, Steiner & Mlotkowski

(57) ABSTRACT

An approach is provided for detecting road closures programmatically by monitoring probe activity. The approach, for example, involves generating a historical model of expected probe activity on the road segment based on historical probe data. The approach also involves monitoring observed probe activity from the road segment. The approach further involves calculating a probability of the observed probe activity based on the historical model of the expected probe activity. The approach further involves determining the closure status of the road segment based on the probability.

20 Claims, 12 Drawing Sheets

(56) References Cited

OTHER PUBLICATIONS

Agarwal et al., "Wavelets in Intelligent Transportation Systems: Data Compression and Incident Detection", 2012, UNLV Theses, Dissertations, Professional Papers, and Capstones, Aug. 1, 2012, 100 pages.

Pang et al., "On Mining Anomalous Patterns in Road Traffic Streams", Published in International Conference on Advanced Data Mining and Applications, Dec. 17, 2011, 14 pages.

* cited by examiner

METHOD, APPARATUS, AND SYSTEM FOR DETECTING ROAD CLOSURES BASED ON PROBE ACTIVITY

BACKGROUND

Providing data on traffic anomalies or incidents (e.g., abnormalities in traffic that can affect traffic flow such as accidents, lane closures, road closures, etc.) is an important function for map service providers. While most traffic anomalies can have at least some negative impact on traffic, road closures can be the most severe because vehicles are unable to travel through the affected roadway. Moreover, the lack of knowledge, particularly real-time knowledge, about a road closure can have an enormous negative impact on a user's trip planning, routing, and/or estimated time of arrival. Obtaining up-to-date traffic information regarding road closures is particularly challenging. For example, service providers often leverage municipality dispatches (e.g., road closure reports), web scraping, police reports, local news, etc. to determine road closure traffic information. However, the information can quickly become out of date and, therefore, not particularly useful. Moreover, the information from these sources is often limited to popular roads and highways and, therefore, difficult to scale to the vast road networks commonly experienced today. Further, trying to update and/or adapt this information in real time may require considerable human interaction (e.g., human observation and/or verification). Therefore, service providers face significant technical challenges to provide up-to-date road closure traffic information that is scalable and that requires minimum human interaction.

SOME EXAMPLE EMBODIMENTS

Therefore, there is a need for detecting road closures programmatically by monitoring probe activity with minimal human interaction.

According to one embodiment, a computer-implemented method for determining a closure status of a road segment based on probe data comprises generating a historical model of expected probe activity on the road segment based on historical probe data. The method also comprises monitoring observed probe activity from the road segment. The method further comprises calculating a probability of the observed probe activity based on the historical model of the expected probe activity. The method further comprises determining the closure status of the road segment based on the probability.

According to another embodiment, an apparatus for determining a closure status of a road segment based on probe data comprising at least one processor, and at least one memory including computer program code for one or more computer programs, the at least one memory and the computer program code configured to, with the at least one processor, cause, at least in part, the apparatus to determine a baseline probe activity for the road segment based on the probe data. The apparatus is also caused to monitor observed probe activity from the road segment. The apparatus is further caused to calculate a likelihood of the observed probe activity from the baseline probe activity. The apparatus is further caused to determine the closure status of the road segment based on the likelihood.

According to another embodiment, a non-transitory computer-readable storage medium for determining a closure status of a road segment based on probe data carries one or more sequences of one or more instructions which, when executed by one or more processors, cause, at least in part, an apparatus to generate a closure model for the road segment, wherein the closure model indicates no probe activity or probe activity below a closure threshold on the road segment. The apparatus is also caused to monitor observed probe activity from the road segment. The apparatus if further caused to calculate a probability of the observed probe activity based on the closure model. The apparatus is further caused to determine the closure status of the road segment based on the probability.

According to another embodiment, an apparatus for determining a closure status of a road segment based on probe data comprises means for generating a historical model of expected probe activity on the road segment based on historical probe data. The apparatus also comprises means for monitoring observed probe activity from the road segment. The apparatus further comprises means for calculating a probability of the observed probe activity based on the historical model of the expected probe activity. The apparatus further comprises means for determining the closure status of the road segment based on the probability.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting road closures programmatically by monitoring probe activity are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
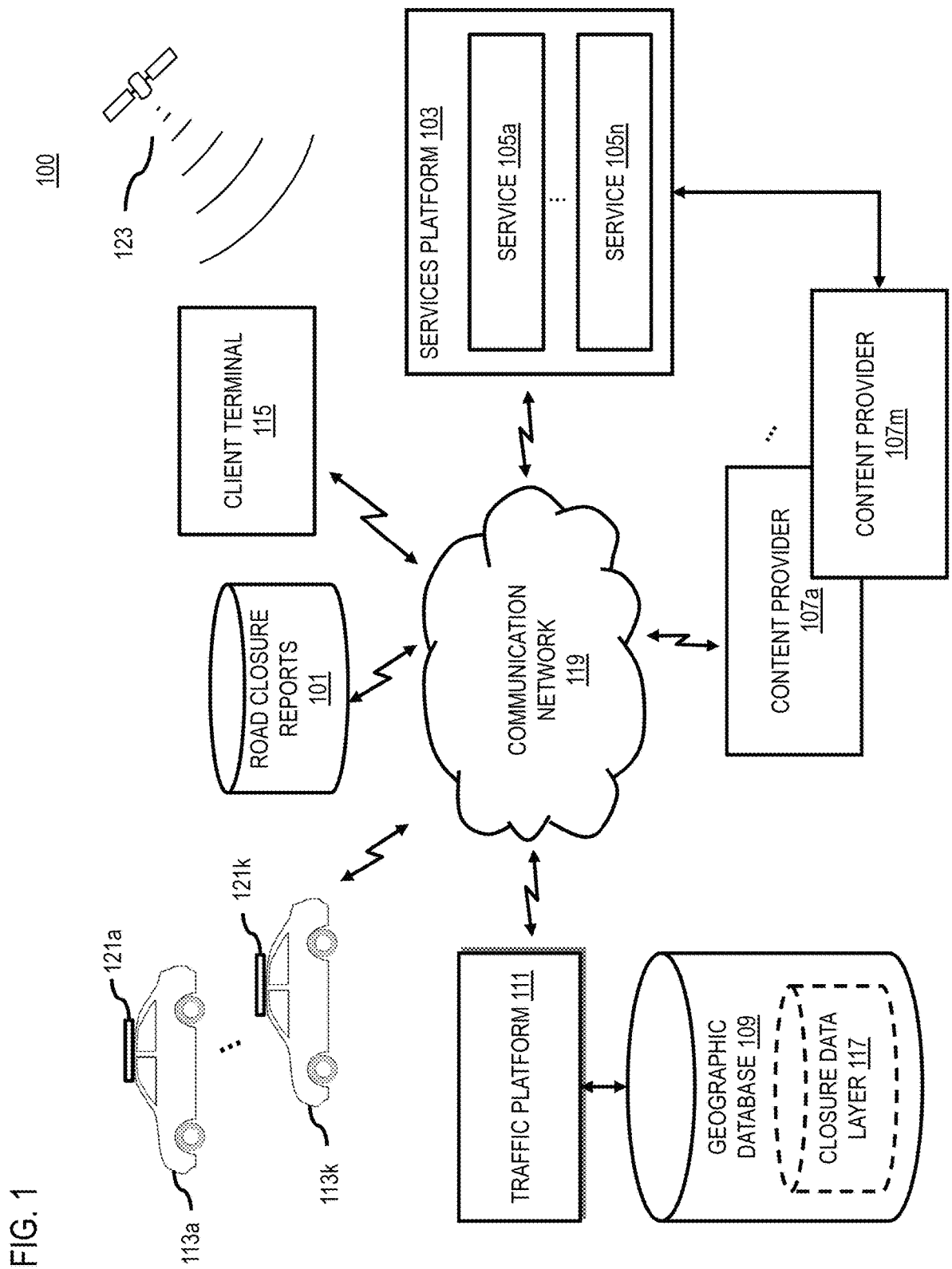
FIG. 1 is a diagram of a system capable of detecting road closures programmatically by monitoring probe activity, according to one embodiment.

FIG. 1 is a diagram of a system 100 capable of detecting road closures programmatically by monitoring probe activity. Generally, traffic incidents such as road closures (e.g., road closure reports 101) are published by government/municipality agencies, local police, and/or third-party official/semi-official sources (e.g., a services platform 103, one or more services 105a-105n, one or more content providers 107a-107m, etc.). The one or more services 105a-105n and the one or more content providers 107a-107m are also collectively referred to herein as services 105 and content providers 107, respectively. By way of example, the published road closure reports 101 can specify the roadway (e.g., by name or matched to specific road link records of digital map data such as a geographic database 109) that has been closed or partially closed to traffic (e.g., vehicular and/or non-vehicular traffic). Closure refers, for instance, to restricting traffic flow on a particular roadway such that no vehicle or a reduced number of vehicle (e.g., reduced with respect to an average free flow traffic volume on the roadway) is permitted or able to travel on the roadway. In one embodiment, a traffic provider (e.g., via a traffic platform 111) monitors the feeds of the road closures reports 101, extracts the affected roadways, and provides traffic data and/or other functions based on the road closure reports 101 (e.g., displays the location of reported closures on the map, generates navigation routes to avoid reported road closures, etc.). Then, traditional traffic service providers wait for another message or road closure report 101 indicating that the road has opened to provide updated data and/or functions. In other words, traditional traffic service providers have historically placed total reliance on these road closure reports 101.

Obtaining up-to-date traffic information on road closures is particularly challenging. For example, traditional traffic service providers often rely on local sources, connections with municipalities (e.g., road closure reports 101), web scraping, police reports, and/or local news sources. However, several potential issues can arise from over reliance on these sources, resulting in providing poor quality data and/or poor user experiences for users of the traffic service. For example, the road closure report 101 could be wrong; i.e., the reported road segment may not be closed. In another scenario, the road closure report 101 might be inaccurate in time and/or location. For example, the road closure report 101 may have been based on a construction-scheduled closure with predetermined start and end times. However, the scheduled closure may have started and/or ended at a different time than specified in the schedule. In yet another scenario, the road closure report 101 could be due to an unscheduled event, and the provider or source of the report could be very late to publish the expiration of the closure event or miss publishing the expiration of the closure (e.g., the re-opening of the road) completely. In addition, a road closure report 101 may be readily accessible for a highway or heavily traveled road, but they may be more difficult to obtain for residential roads and as such are difficult to scale.

In such cases, users of a traffic service that rely on problematic data can suffer from unexpected delays, reroutes, etc. As a result, users may gradually lose their trust in the service if such events occur frequently. To minimize this risk, traffic service providers have traditionally deployed human resources to monitor closures from multiple sources and to report incidents accurately. However, human or manual monitoring and verification can be resource intensive and may not scale well. For example, as the number of incidents or closures increase (e.g., with increased coverage area), so does the labor cost and chances for human errors. Therefore, traffic service providers face significant technical challenges to reduce the manual resources needed for human-based verification of road closures.

Road network activity can also be monitored leveraging other complementary sources such as cameras, loop sensors (e.g., for detecting vehicles passing or arriving at a certain point), probe data, etc. Probe data is becoming a key asset both from crowd-sourced data and business or consumer devices which use navigation systems. In general, probe data is data that is sampled from sensors of vehicles traveling in a road network that represent the vehicles' position and/or heading (e.g., a vehicle pose) at a sampled time. Probe data may be reported as probe points, which are individual data records collected at a point in time that records telemetry data for that point in time. A probe point can include attributes such as: (1) probe ID, (2) longitude, (3) latitude, (4) heading, (5) speed, and (6) time. In one instance, this data allows the system 100 to calculate or construct vehicle paths of a vehicle over a stretch of road (e.g., over a closure link graph). Other examples of products built on probe data are average speed patterns and road accidents. However, processing the volumes of probe data in real-time or substantially real-time with less or minimal human interaction relative to current approaches poses a number of technical challenges.

To address this problem, the system 100 introduces a capability of detecting road closures by monitoring probe activity. In one embodiment, this monitoring includes: (1) computing normal or expected road activity using individual probe vehicle counts from historical data for a road segment of interest (e.g., a historical baseline), (2) observing recent or current probe activity for the same piece of road for comparison against the historical baseline, and (3) assessing the likelihood of such observations of the current probe activity. Based on the assessment of the likelihood, the system 100 can then detect a road closure on the road segment of interest and/or otherwise provide data regarding the assessment for follow-up or further investigation. For example, the system 100 can provide data to present a framework, like a dashboard, that allows an end user to visually inspect traits or features of the road closure detection process (e.g., historical probe activity, recent probe activity, historical baseline parameters, etc.) to help validate the detection, In one embodiment, the system 100 first computes a historical baseline or reference model for a road or link of interest by determining the expected or normal activity (i.e., traffic flow) on the road. The historical baseline or reference model, for instance, can be a probabilistic or predictive model that inputs a probe activity attribute value (e.g., an observed probe volume, probe speed, etc.) and outputs a predicted probability or likelihood of the input value being observed in light of the historical data. In one instance, the system 100 can collect probe data for a designated time span (e.g., one year or longer) to create the historical probe data set, and then map-match the historical probe data to road links of a digital map (e.g., a geographic database 109) representing the road segments or road network being monitored for road closures. In addition or alternatively, the system 100 can retrieve the historical probe data from a historical database (e.g., a database maintained by third parties such as but not limited to the services platform 103, services 105, and/or content providers 107). In either case, the probe data can be collected or derived, for example, from probe vehicles (e.g., vehicles 113a-113k, also collectively referred to herein as vehicles 113), a client terminal 115 associated with a user of a vehicle 113 (e.g., a navigation device, mobile device, smartphone, etc.), or a combination thereof traveling the road segments of interest.

In one embodiment, the system 100 map matches the probe data by processing the raw location data (e.g., probe data comprising GPS trace points or other location data) to identify which road, path, link, etc. a probe device (e.g., a vehicle 113, a client terminal 115, etc.) is traveling, and to determine the location of the probe device on that identified road segment, link, etc. For example, the probe data can contain individual drives by multiple vehicles. The map matching process then enables the system 100 to correlate each drive to a corresponding segment of the road. Each road segment, in effect, acts as a bin for collecting the probes collected on that segment. In one embodiment, the binned historical data can then be further stratified by time (e.g., into different time epochs of designated or varying lengths). Based on the map matching, the system 100 can then generate probe activity statistics (e.g., vehicle probe volume, vehicle probe speed, etc.) to generate the historical models or probe activity. Consequently, for each road segment being monitored, a historical baseline is computed and stored (e.g., in the geographic database 109). This can be used by the system 100 as a reference model for the road activity. In cases in which the historical is grouped by time epochs, the historical model can also be calculated per time epoch per road segment.

In one embodiment, the system 100 compares any later probe data matched onto a road segment against the historical baseline or reference model for that road segment. In other words, the system 100 compares recent or current probe activity observations collected for a road segment of interest against the historical baseline model of probe activity. In one embodiment, the system 100 dynamically determines what constitutes "recent or current" probe activity based on factors such as but not limited to: (1) attributes or characteristics of the road or link of interest; and (2) the amount of probe data available to determine probe activity (e.g., the "strength of the signal"). For example, the system 100 may determine that the time period that is classified as recent or current for determining probe activity on a road or link can vary with the expected traffic on the road segment. Roads on which one would expect considerable traffic (e.g., a highway) may have a shorter time interval (e.g., 15 minutes, a few hours, a half of a day, etc.) for collecting recent or current activity, while roads on which one would expect less traffic (e.g., residential roads or side streets) may have a longer time interval (e.g., a few days, a week, etc.). In this way, the system 100 can advantageously ensure that there are at least a minimum or a comparable number of probe activity observations in the set of recent observations that is to be used for road closure detection.

In one embodiment, the system 100 compares the recent or current probe activity against the historical baseline model to determine the likelihood of such observation (i.e., what is the probability that the recent observation is consistent with what was expected). The system 100 can use different statistical or probability models to describe the probe activity distribution (e.g., probe count distribution) for the historic and/or the observed, depending on the properties of the underlying probe data or probe data providers (e.g., content providers 107). In other words, the system 100 can use any suitable statistic or discrete probability distribution to determine the odds or the likelihood of the observed probe activity such as but not limited to a Poisson distribution, a Gaussian approximation of the Poisson distribution, or equivalent. In either case, the system 100 determines the model parameters to best fit the selected model (e.g., selected probability distribution) to the observed historical data for the road segment being monitored. The model with the best-fit model parameters can then be used to evaluate the likelihood or probability of seeing any recent probe activity values based on the historical observations.

Figure 2A:
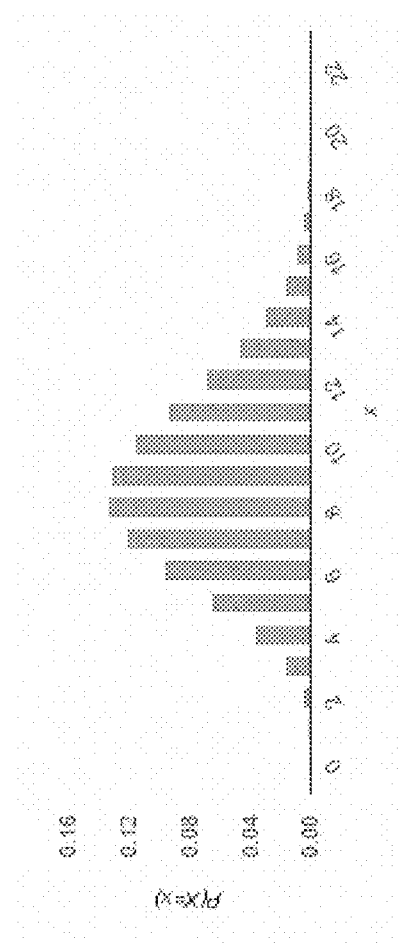
FIGS. 2A-2D are diagrams of an example historic probe count distribution, according to one embodiment.

The following illustrates an example use case of using a Poisson distribution (i.e., a model of the number observed (N) events→∞ over a fixed or specified interval of time) to model historical probe activity. In this example, the system 100 obtains a set of historical probe volume data comprising 12 historical probe volume observations for a road segment of interest. The 12 historical probe volume observations (e.g., number of observed probe vehicles) are as follows: 10, 9, 7, 10, 11, 8, 6, 12, 10, 10, 4, and 9. The average probe count or historical baseline is 8.83 or 8 vehicles. In one embodiment, the system 100 can then determine the probability or likelihood of any subsequently observed probe data (i.e., the observed probe count) based on the Poisson distribution where the expected value ($\lambda$) is 8.83. For example, given the example Poisson distribution above, the likelihood of 7 observed vehicles (e.g., vehicles 113) passing or arriving at a certain point on the road segment ABC is 12.138%; the likelihood of 6 observed vehicles is 9.619%, the likelihood of 4 vehicles is 3.698%, the likelihood of 2 vehicle is 0.57%, the likelihood of 1 vehicle is 0.129%, and the likelihood of 0 vehicles is 0.015%, as depicted in the example Poisson Distribution of the FIG. 2A. Although the Poisson distribution also includes the probability of occurrences or events greater than the expected outcome (e.g., 8.83), because the primary objective of the system 100 is to determine the likelihood of a road closure, the system 100 can ignore probe counts greater than the mean since they intuitively are not indicative of a road closure.

In another use case, the system 100 can use a Gaussian approximation of the Poisson Distribution to describe the probe count distribution (e.g., historic and/or observed probe counts). The Gaussian approximation is useful where the number of events N is very large, as is the case where the probe data is collected for a significant time span, since in those instances, the events N may be considered to have an approximately normal or Gaussian distribution. The use of the Gaussian approximation, for instance, also allows the system 100 to better leverage the chi-square distribution to assess the probability of the observed probe count. For example, the system 100 can use the chi-square distribution to determine whether the variation in the historic and/or recent or current probe activity is due to chance or whether the variation is beyond what random chance would allow. In other words, if the calculated likelihood of observing probe activity below the historical mean is less than a threshold probability, it is likely that the observed reduction in probe activity is not likely to be attributable to chance, and more likely attributable to an anomaly such as a road closure.

Figure 2B:
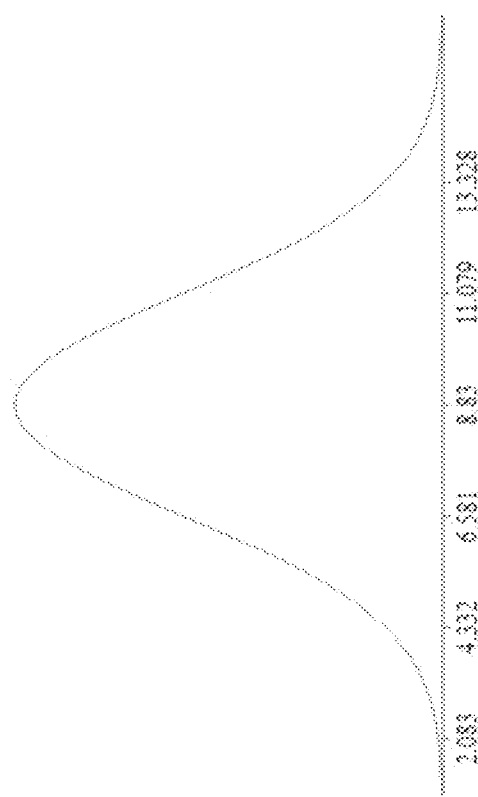

Following the example of road segment ABC, the system 100 can determine an example Gaussian approximation given a mean (e.g., 8.83) and a standard deviation (e.g., 2.249) from the data set described above, as shown in FIG. 2B. For example, the system 100 can determine that the likelihood or probability of an observed probe activity count between 9 and 7 is 32.22%; between 8 and 6 is 25.19%; between 7 and 5 is 16.36%; between 6 and 4 is 8.83%, between 5 and 3 is 3.95%; between 4 and 2 is 1.47%, between 3 and 1 is 0.45%; between 2 and 0 is 0.12%; and below 1 is 0.02%. Similarly, the system 100 can also determine that the probability of a probe count less than 1 is 0.02%; less than 2 is 0.12%; less than 3 is 0.48%; less than 4 is1.59%; less than 5 is 4.43%; less than 6 is 10.41%; less than 7 is 20.27%; less than 8 is 35.6%; and less than 9 is 53%. The calculated percentages help the system 100 to determine the likelihood of what was observed relative to what was expected such that if the calculated probability is relatively low, the system 100 can infer that what was expected (i.e., traffic flow) did not occur and that one possible explanation for the statistical deviation was that the road was closed.

In one embodiment, to be robust to single outliers, the system 100 scores a small set of recent measurements (i.e., a sliding window) rather than a single measurement to describe the latest road activity. For example, if the probe count of interest occurred over a specific time interval (e.g., a day of the week, time of day, etc.), the system 100 can also consider the probabilities of a number of probe counts before, a number of probe counts after, or a combination thereof to determine the likelihood of the probe count of interest (i.e., the determination may be based on a compilation versus a single count probability). In one embodiment, the system 100 may score fewer probe measurements (i.e., use a smaller sliding window) on a road that historically has a lot of traffic and, therefore, has a consistent measurement of probe data activity. In contrast, the system 100 may score more probe measurements (i.e., use a large sliding window) on a road that historically has minimal traffic, and/or the normal traffic is sparse on the road to begin with. In one instance, the small set or sliding window is employed by the system 100 to reduce the likelihood of determining the closure status of the road segment based on an anomaly of some sort. For example, a probe count anomaly may be based on a train passing, a data transmission error, or the like (i.e., any instance where the reported activity is less or more than expected for a reason other than chance). As mentioned above, the chi-squared distribution is also helpful in preventing such errant determinations.

Figure 2D:
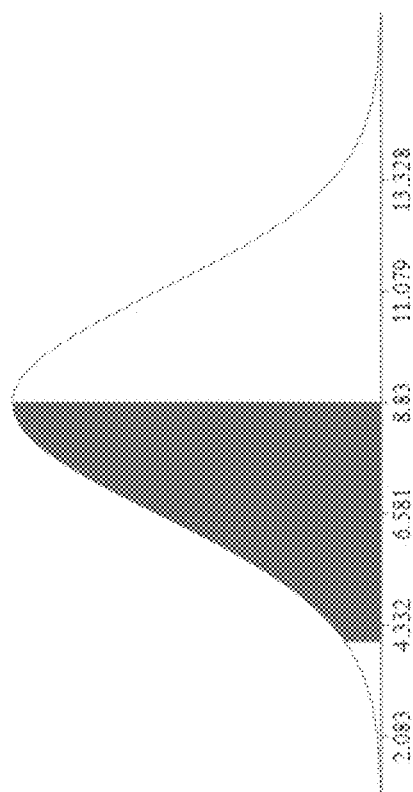
Figure 2C:
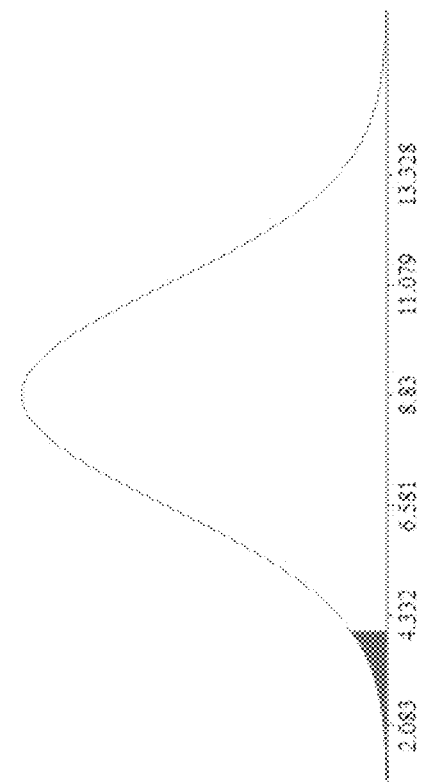

In one embodiment, when the system 100 determines that the likelihood of this sliding window drops below a certain threshold (i.e., a percentage of probability), the system 100 defines the road segment potentially closed. In one embodiment, the system 100 can optimize the threshold based on the attributes of the monitored roads (e.g., road type), probe data (e.g., type of signal), severity of the closure target (e.g., a completely closed road versus a road experiencing heavy congestion), etc. Following the example of the road segment ABC above, the system 100 can determine that an observed probe count or value of 4 or less (e.g., having a 1.59% probability, as depicted in FIGS. 2C and 2D) suggests that the road segment is potentially closed. In one instance, the system 100 can flag or label the road segment ABC potentially closed in a database (e.g., a closure data layer 117 of the geographic database 109).

In one embodiment, once a road segment is flagged or labeled as potentially closed, the system 100 can initiate a process of verification or validation. In one instance, the system 100 can employ one or more on automated systems (e.g., the services 105 and/or the services platform 103), can prompt a human manual verification (e.g., viewing the road through a traffic camera), and/or a combination of both. In the rare case, the system 100 can prompt a user to drive to the road segment to validate or contradict the predicted road closure status based on visual observation and/or probe activity derived from the vehicle used to drive to the road segment.

In one embodiment, the system 100 defines a "detection point" as the time at which the closure is detected. In one instance, the detection point may be the point at which the system 100 determines that the odds of the segment being closed are greater than the odds that the segment is open. In another instance, the detection point may be the time at which the system 100 validates the prediction that the segment is closed whether by automated or human means. In one embodiment, the system 100 defines the "change point" as the time when the road segment transitioned from being open to closed (or the opposite). Since the change point is in the past, it does not improve the response time to a closure but is useful to assess whether the road segment is closed or not (i.e., the change point is useful for validation purposes).

In one embodiment, the system 100 determines the change point by comparing two models of the road activity: the historical baseline model (as described above) and a closure model, which might show exactly zero activity or some very reduced probe activity depending on the goal. In other words, the closure model comprises what the probe activity would look like if the road segment was in fact closed. In one embodiment, the change point is defined as the time interval for which the logarithm of the likelihood ratio of the two models is minimum. In other words, the likelihood ratio compares the likelihood of seeing an observed probe activity value (e.g., probe volume) computed using the historical baseline model for the road segment, to the likelihood of seeing the same observed probe activity value computed using the closure model for the road segment. By way of example, the likelihood ratio or equivalently its logarithm expresses how many times more likely the probe data is under or is consistent with one model than the other. Therefore, the system 100 can use the detected change point to determine when the road segment has started transitioning from an open status to a closed status. Conversely, in one embodiment, the system 100 can use the change point to determine when the road segment reopens (e.g., transitions from a closed state to an open state).

In one embodiment, the system 100 can use the closure model described above in place of the historical model when evaluating the closure status of a road segment. By using the closure model as the default, the system 100 effectively sets the closed as the default status of a road segment. Then, when recent observations have a low likelihood of being observed with respect to the closure model, the monitored road segment is likely to be open. Accordingly, in one embodiment, the system 100 monitors the road segment in the same way as described above, but with the role of the historical baseline model and the closure model flipped. Specifically, the system 100 compares the observed probe activity to the closure model and the system 100 can determine that the road segment has reopened when the closure model indicates that the probability of seeing the observed probe activity value is below a threshold value. In other words, the system 100 determines that the closure model would be a bad description of the recent probe activity.

Figure 6A:
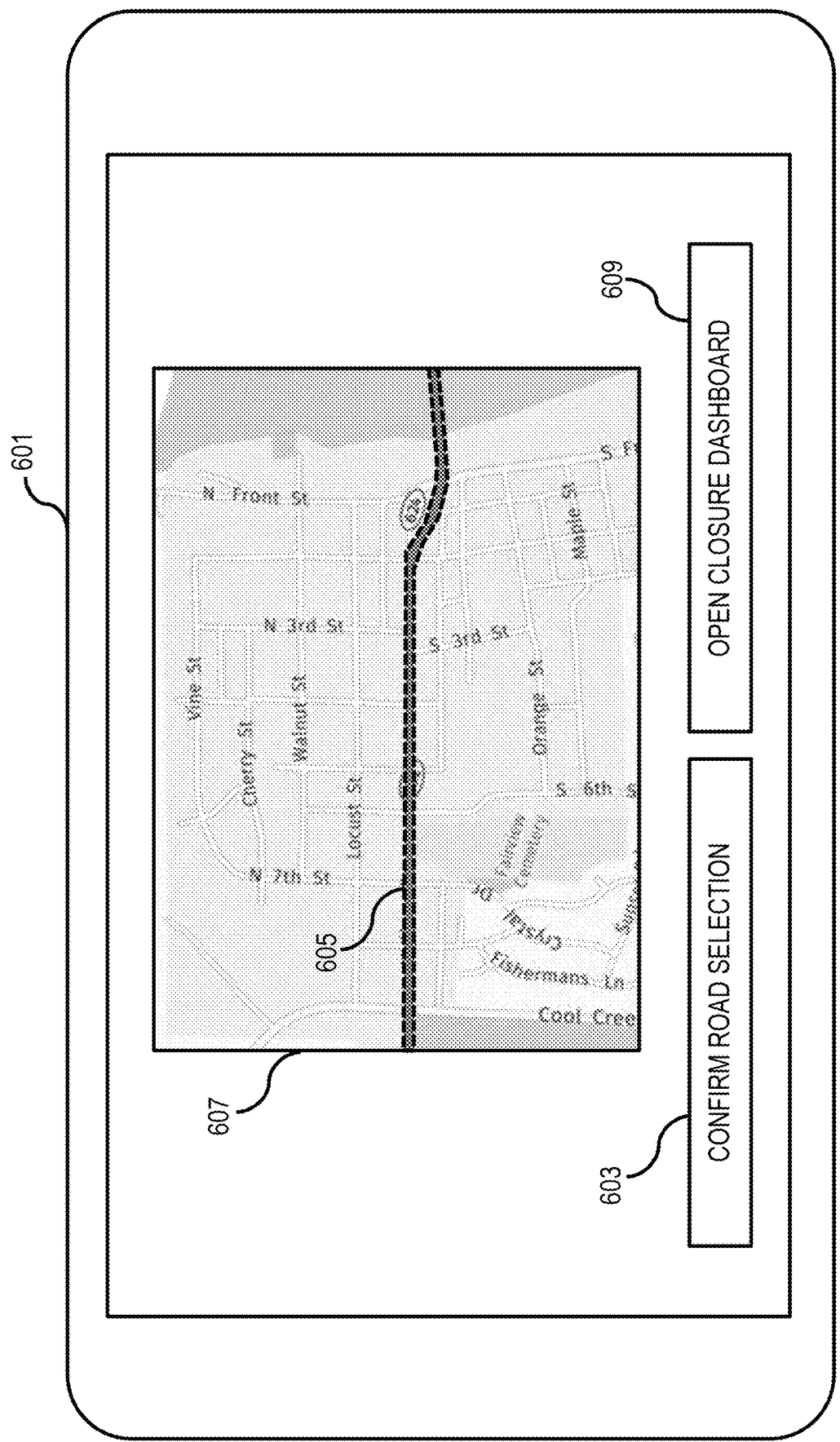
FIGS. 6A and 6B are diagrams of an example user interface for displaying and scoring traits or features of the road closure detection process, according to one embodiment.
Figure 6B:
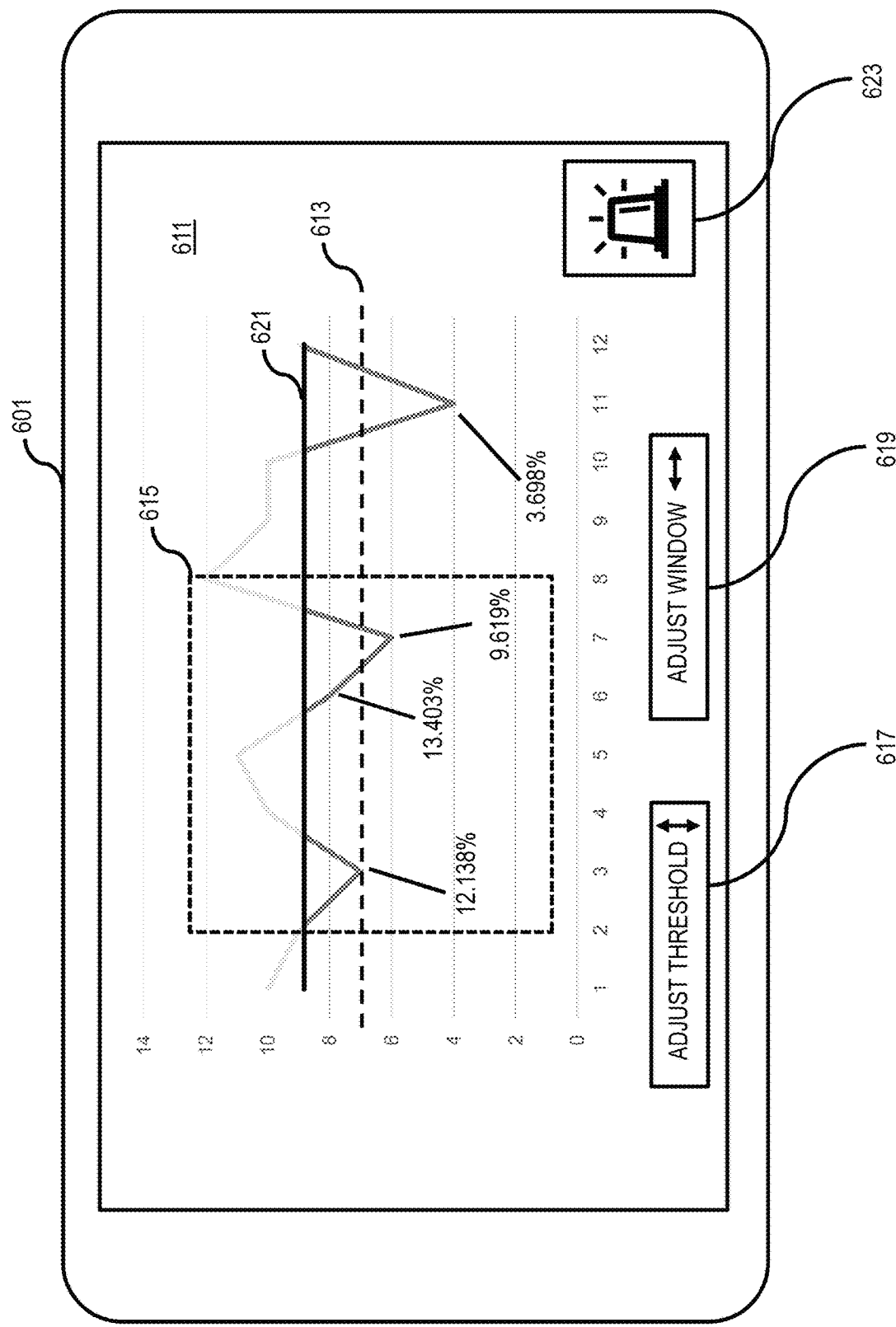

In one embodiment, the system 100 can display and score the time series of each road segment that showed one or more multiple closure detections to tune the parameters of the system 100, such as the likelihood threshold, the sliding window, the closure module, or a combination thereof. Examples of such a display are depicted in FIGS. 6A and 6B. In one instance, the system 100 uses the scores to get some sort of "ground truth" by labeling the detections as true or false. In other words, the system 100 can attempt to validate the accuracy of the selected threshold. In one embodiment, the system 100 can utilize the visual aspect or display to derive better metrics to score the models as well as refine the initial Poisson model.

In one embodiment, the system 100 can run off-line for study purposes and in such instances, the system 100 can factor a figure of merit (i.e., a numerical expression representing the performance or efficiency of the system 100) into the determined detection point and change point based on the logarithm of the open-to-closed likelihood ratio computed on the last day (or any other meaningful time window) of activity. In one instance, a large positive value indicates a strong preference for determining a road closure, whereas a large negative value suggests that the road is most likely open. In contrast, the system 100 can interpret small positive or negative numbers as suggesting that the model can either be right or wrong and, therefore, further analysis is required.

Figure 3:
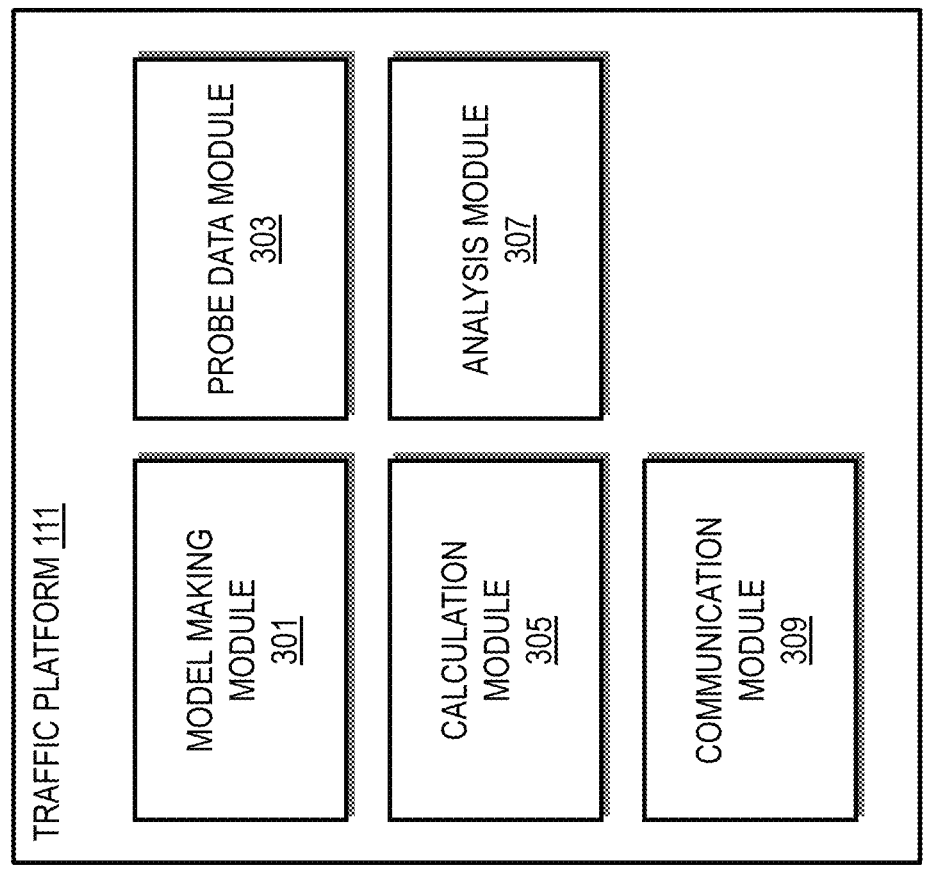
FIG. 3 is a diagram of the components of a traffic platform configured to detect road closures by monitoring probe activity.

FIG. 3 is a diagram of the components of a traffic platform configured to detect road closures by monitoring probe activity. By way of example, the traffic platform 111 includes one or more components for determining a closure status of a road segment based on probe data according to the various embodiments described herein. It is contemplated that the functions of these components may be combined or performed by other components of equivalent functionality. As shown, in one embodiment, the traffic platform 111 includes a model making module 301, a probe data module 303, a calculation module 305, an analysis module 307, and a communication module 309. The above presented modules and components of the traffic platform 111 can be implemented in hardware, firmware, software, or a combination thereof. Though depicted as a separate entity in FIG. 1, it is contemplated that the traffic platform 111 may be implemented as a module of any of the components of the system 100 (e.g., services platform 103, services 105, a component of the vehicle 113, the client terminal 115, etc.). In another embodiment, one or more of the modules 301-309 may be implemented as a cloud-based service, local service, native application, or combination thereof. The functions of the traffic platform 111 and modules 301-309 are discussed with respect to FIGS. 4 and 5 below.

Figure 4:
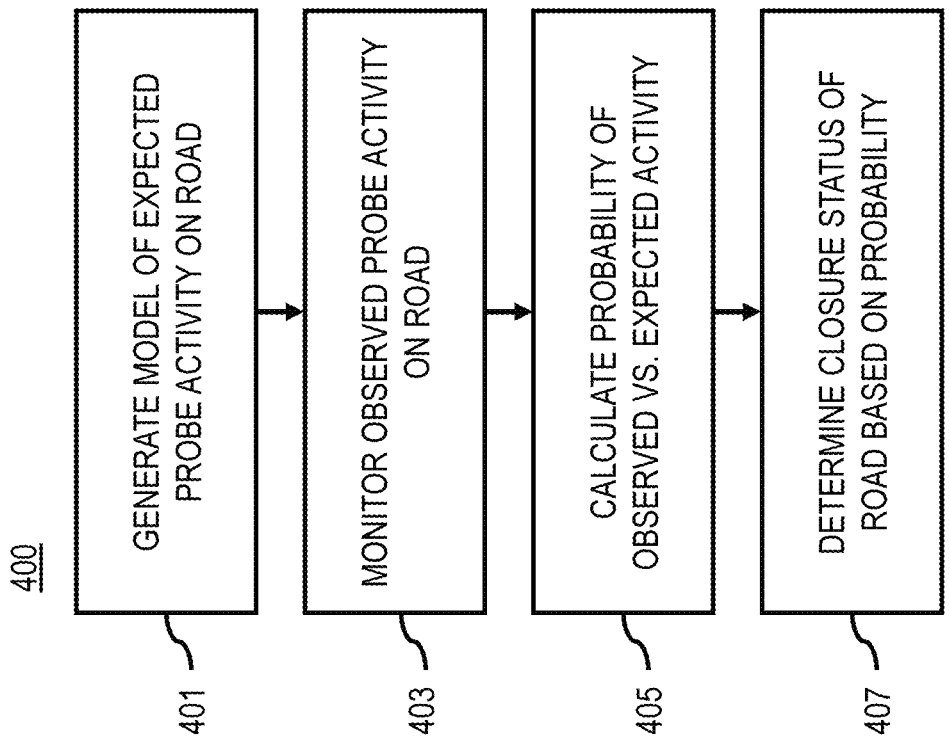
FIG. 4 is a flowchart of a process for determining a closure status of a road segment based on probe data, according to one embodiment.
Figure 9:
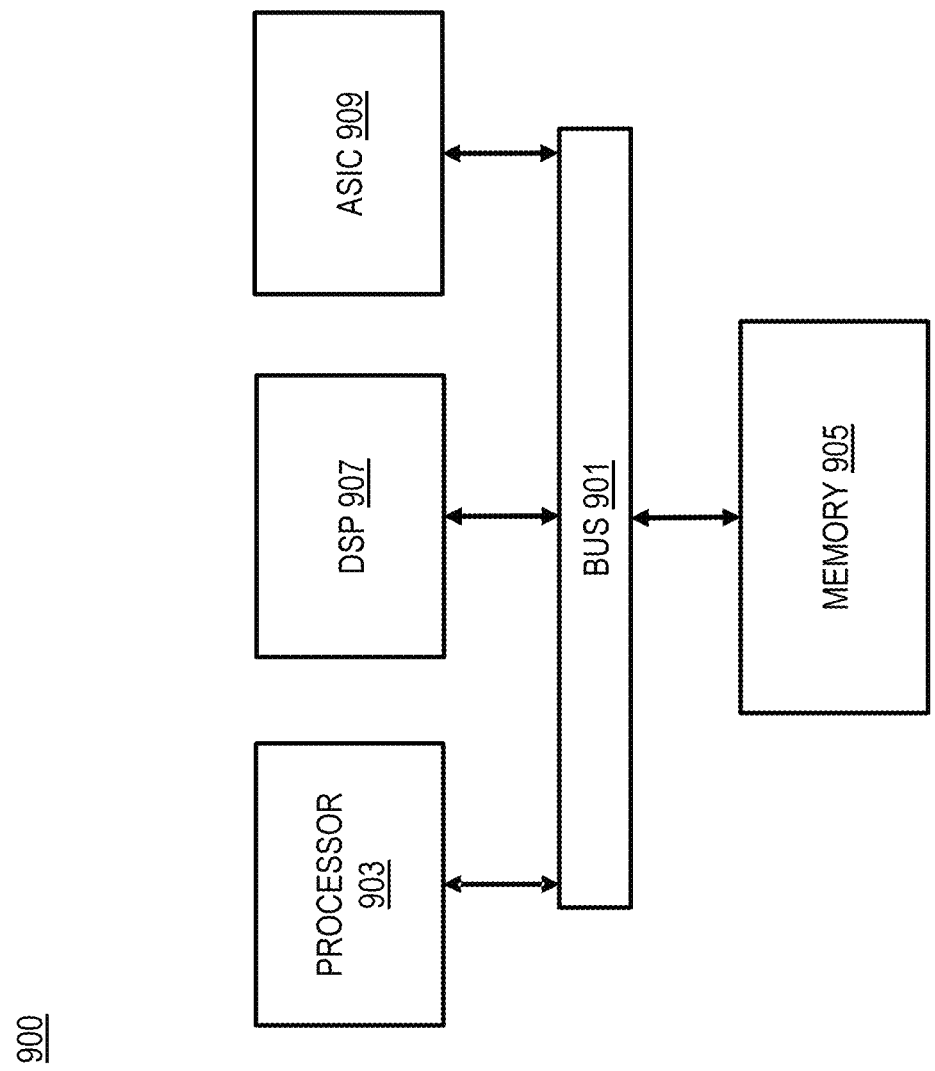
FIG. 9 is a diagram of a chip set that can be used to implement an embodiment.

FIG. 4 is a flowchart of a process for determining a closure status of a road segment based on probe data, according to one embodiment. In various embodiments, the traffic platform 111 and/or any of the modules 301-309 may perform one or more portions of the process 400 and may be implemented in, for instance, a chip set including a processor and a memory as shown in FIG. 9. As such, the traffic platform 111 and/or any of the modules 301-309 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the model making module 301 generates a historical model of expected probe activity on the road segment based on historical probe data. By way of example, the expected probe activity may comprise normal road activity on the road segment (e.g., average free flow traffic). In one embodiment, the probe activity may include or be based on a probe volume, a probe speed, and/or any other probe activity attribute indicated in probe data. In one instance, the expected probe activity may be based on an average or a mean of the probe activity on the road segment over a specific interval. For example, the model making module 301 may derive the expected probe activity from an average N probes that passed or arrived at a certain point on the road segment and/or an average of the speed at which the N probes passed or arrived at a certain point on the road segment. By way of example, the historical model may be any statistical or probability-based model that can describe a probe count distribution (e.g., stored in the geographic database 101). As discussed above, the model can be any probability model or equivalent that can be used to predict a likelihood of an observed probe activity value in view of historical probe activity for a road segment. In one embodiment, the model making module 301 generates the historical model based on a Poisson distribution, a Gaussian approximation of the Poisson distribution, or a combination thereof. In one example, the model making module 301 may generate the historical model based on the Gaussian approximation instead of a traditional Poisson distribution where the volume of probe data is very large (e.g., >1000 probe instances).

In step 403, the probe data module 303 monitors observed probe activity from the road segment. In one instance, the observed probe activity is recent or current probe activity that has been recently determined from activity on the road segment (i.e., not historical data or data gathered over a significant time span). Alternatively, the probe activity observations being compared can be collected from any other time period or epoch (including other historical time epochs) when operating in a non-real-time use case or when real-time road closure detection is not needed or desired. In one instance, the probe data module 303 may observe or collect the probe activity data from sensor data collected from the sensors equipped on a probe vehicle (e.g., sensors 121 of a vehicle 113), a client terminal 115 (e.g., a mobile device application, a navigation system, etc.), or a combination thereof. In one embodiment, the probe data include raw probe point data (e.g., location, heading, and timestamp). The probe data module 301 can then aggregate the probe data from multiple probe vehicles and/or multiple drives of the vehicles to derive the probe activity data used in the embodiments described herein. For example, the probe data can be processed to determine the level or amount of traffic flow (e.g., vehicular traffic, pedestrian traffic, etc.) on the road segment. This traffic flow, for instance, can be represented as probe volume (e.g., the count of the number probe vehicles on a road segment at a monitored time period), probe speed (e.g., the average speed of probe vehicles on a road segment at a monitored time period), and/or equivalent. In one embodiment, the probe data module 303 monitors the observed probe activity programmatically (i.e., using a computer program, code, or algorithm) such that minimal human interaction is required.

In one embodiment, the probe data module 303 monitors the observed probe activity over a most recent predetermined time period. In one instance, the most recent predetermined time period may be defined by a sliding window. By way of example, the probe data module 303 may determine the most recent predetermined time period based on the road or link of interest and/or the relative strength of signal or probe activity. In one instance, the probe data module 303 can determine what constitutes the most recent time period and/or the size of the sliding window based on the nature of the road segment and/or the signal or probe activity data available for that road segment. For example, the most recent time period for a busy road segment (e.g., a highway) where there is a high level of probe activity may be a relatively short time period (e.g., 10 minutes, a few hours, a half of a day, etc.) and the most recent time period for a quiet or less busy road (e.g., a residential road) where there traffic flow is normally sparse to begin with may be a relatively long time period (e.g., a few days, a week, etc.).

In step 405, the calculation module 305 calculates a probability of the observed probe activity based on the historical model of the expected probe activity. By way of example, the probability is the likelihood that the observed probe activity is consistent with the historical model or baseline for the road segment over the specific time interval. In other words, the likelihood represents the probability that the observed probe activity would occur normally on the road link. The normal or baseline state is modeled by the historical model. In one embodiment, the calculation module 305 calculates the probability based on any suitable statistical or probability model that can describe a discrete probe activity (e.g., probe count) distribution. In one instance, the calculation module 305 calculates the probability based on modeling the historical probe activity with a Poisson distribution, a Gaussian approximation of the Poisson distribution, or a combination thereof. By way of example, the calculation module 305 may employ the Gaussian approximation where the quantity of the historical data is extremely large (e.g., >1000 data points) as is the case here. In one embodiment, the calculating of the probability by the calculation module 305 and the subsequent determining of the closure status on the road segment by the analysis module 307 are initiated based on the calculation module 305 determining that the observed probe activity is less than a baseline probe activity level (i.e., an average or mean probe activity level). By filtering for only those cases where the observed values are below the historical mean, the traffic platform 111 can expend computation resources only on evaluating links where probe activity has been reduced below the historical average indicating that the road segment may be adversely affected by a traffic incident or anomaly such as a road closure. In other words, the calculation module 305 can assume, for example, that probe activity greater than the average or baseline value indicates that the road segment is open (i.e., the observed activity is consistent with an average free flow of traffic during that time interval or more).

In one embodiment, if the calculation module 305 determined that the observed probe activity was greater than the baseline probe activity level, the traffic platform 111 can infer that the increased traffic flow on the road segment of interest may be due to one or more nearby road segments being closed (i.e., the increased traffic flow comprises rerouted traffic flow) and, therefore, the traffic platform 111 may want to flag one or more of the nearby road segments for further road closure detection and/or analysis.

In step 407, the analysis module 307 determines the closure status of the road segment based on the calculated probability or likelihood of the observed probe activity. In one instance, the analysis module 307 can determine that the road segment is open if the probability of the observed probe activity (as calculated by the calculation module 305) is greater than a probability threshold (e.g., a percentage) and the analysis module 307 can determine that road segment is closed if the probability of the observed probe activity is less than that threshold. In one embodiment, the analysis module 307 determines the threshold based on ground truth data (e.g., road closure detections labeled as true or false). In one instance, the analysis module 307 may optimize the threshold for the road graph, probe data, severity of the closure, or a combination thereof. By way of example, in the use case example described above with respect to FIGS. 2A-2D, the system 100 determined the probability threshold based on an approximate doubling of the standard of deviation of the historical probe data. For example, the likelihood of 4 vehicles relative to the expected value of 8.83 is 3.698% (Poisson) or 3.95% (Gaussian) and the probability that the number of vehicles is less than 4 is 1.59%. Given the low degree of probability (as depicted in FIGS. 2C and 2D), the analysis module 307 can infer that probe activity below this level or within the area of FIG. 2C is indicative of a closed closure status and that the prove activity above this level or within the area of FIG. 2D is indicative of an open closure status.

Figure 5:
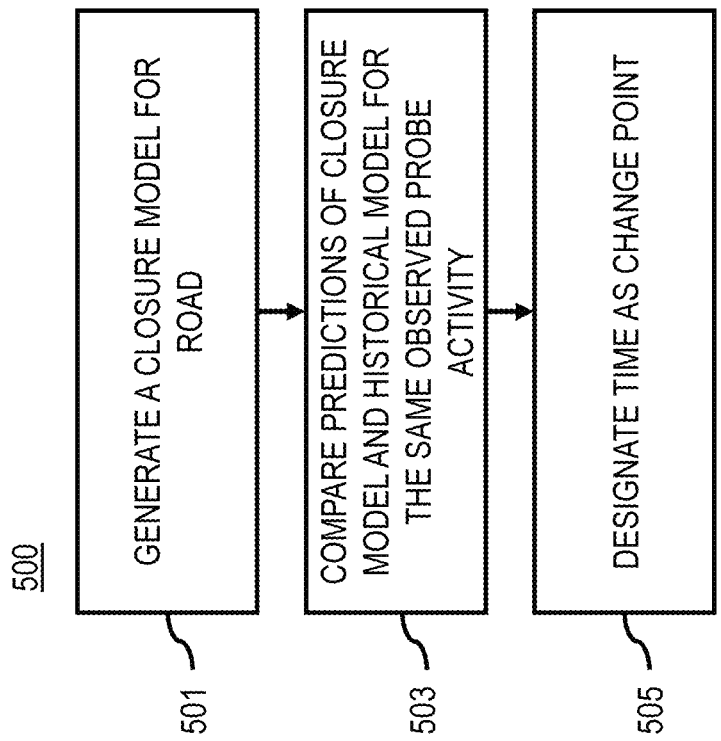
FIG. 5 is a flowchart of a process for determining the time when a road segment transitioned from being open to closed (or the opposite), according to one embodiment.

FIG. 5 is a flowchart of a process for determining the time when a road segment transitioned from being open to closed (or the opposite), according to one embodiment. In various embodiments, the traffic platform 111 and/or any of the modules 301-309 may perform one or more portions of the process 500 and may be implemented in, for instance, a chip set including a processor and a memory as shown in FIG. 9. As such, the traffic platform 111 and/or any of the modules 301-309 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the model making module 301 generates a closure model for the road segment. In contrast to the historical model of probe activity discussed above, the closure model represents the historical distribution of probe activity for a road segment that is known to be closed. In one embodiment, the relationship between the historical model and the closure model can be used to determine the transition point for the closure status of a road. In most scenarios, the closure model is likely to show no probe activity or a probe activity below a closure threshold on the road segment because no probe vehicles would be expected to travel on the road when the road is closed, and/or for those vehicles on the closed road, their speeds would be zero or close to zero because they would not likely be able to move. In one embodiment, the closure threshold may be used to account for statistical or computation anomalies such that although the probe count is not zero, there may still be a relatively high level of certainty that the road is closed (e.g., 1 probe count over a span of 3 hours on a normally busy highway). In one instance, the model making module 301 may determine the closure threshold based on the severity of the closure that the analysis module 307 is attempting to determine. For example, in the instance where the analysis module 307 is determining a closure status of a road segment, the closure threshold may be zero or some very reduced probe activity. However, in the instance, where the analysis module 307 is determining a congestion status of a road segment, the closure threshold may be somewhere between zero and the average or expected value and likely closer to zero than the average.

In step 503, the analysis module 307 compares the predictions of the both the historical model and the closure model on the same probe activity observations to identify when a road segments transitions from open to closed and/or vice versa. In one embodiment, the analysis module 307 determines a time interval at which a logarithm of a likelihood ratio between the closure model and the historical model is at a minimum. By way of example, the likelihood ratio or equivalently its logarithm expresses how many times more likely the observed probe activity is consistent with the closure model or the historical model. When the ratio is computed using the historical likelihood to the closure likelihood, the time corresponding to the minimum represents the point where the historical likelihood decreases to a point that crosses the increasing closure likelihood (i.e., transitioning from open to closed). In some cases, at this minimum, the observed probe activity may be (but not necessary) equally or approximately consistent with both the historical model and the closure model at the time when the historical values are equal to or approximately equal to the values of the closure model (e.g., zero or a very low number). Consequently, the analysis module 307 can determine that at that time interval, the observed probe activity indicates that the road segment is transitioning from open to closed even though it may have not yet reached the detection point to indicate that the segment has met the criteria for being closed.

Accordingly, in step 505, the communication module 309 designates the time interval as a change point. In one instance, the change point represents a time when the road segment transitioned between an open state to a closed state, or between the closed state and the open state. By way of example, an open state can mean a free flow of traffic and a close state can mean that zero or a statistically insignificant amount of traffic flows on the road segment. In one instance, the change point occurred in the past, so it doesn't improve a response time to a closure; however, the analysis module 307 can use the change point to subsequently validate and/or confirm the road closure detection or determination (e.g., as true or false). In other words, in one embodiment, the traffic platform 111 can first determine a probability of the observed probe activity based on the historical model and then determine the likelihood of the detection based on the comparison of the closure model and the historical model. For example, if the observed probe activity was calculated to have an extremely low probability (i.e., a significant deviation from the expected value) and the logarithm of the likelihood ratio was minimum, the traffic platform 111 can infer with a high degree of certainty that the road segment is closed. However, if there was some inconsistency between the two measures, the traffic platform 111 may need to request subsequent validation (e.g., human manual verification) to determine which model was the more accurate measure.

In one embodiment, the calculation module 305 can calculate a probability of the observed probe activity based on the closure model of the expected probe activity rather than and/or in addition to the historical model. In other words, the calculation module 305 can determine the probability that the observed probe activity is consistent with no probe activity or a probe activity below a closure threshold on the road segment rather than an average or mean value. Although the baseline model may be different in this instance, the same approach is applied. For example, the closure status of the segment is classified as open when the analysis module 307 determines that the calculated probability is below a probability threshold. Again, the threshold may be optimized for the road graph, probe data, severity of the closure, or a combination thereof. With respect to calculating the change point, reversing the position of the historical model and the closure model when determining the ratio of likelihoods changes the minimum to indicate the transition point for the road segment to change from closed to open.

FIGS. 6A and 6B are diagrams of an example user interfaces for displaying and scoring time series of a road segment based on probe activity, according to one embodiment. In this example, a user interface (UI) 601 is generated for a client terminal 115 (e.g., a vehicle navigation device, a mobile device, or a combination thereof) that includes an input 603 that enables a user to select and/or confirm a road segment of interest 605 on a road representation (e.g., a digital map 607). In one embodiment, the road segment 605 may already be graphically represented on the digital map 607 as open (e.g., green), closed (e.g., red), congestion (e.g., yellow), or a combination thereof. However, in one instance, a user (e.g., a software developer) may want to visually inspect the traits or features of the detection process to help validate the detection.

In one instance, the UI 601 also includes an input 609 that enables a user (e.g., a software engineer) to transition (or toggle) between the road representation and a visual dashboard 611, as depicted in FIG. 6B. In one instance, the dashboard 611 can enable a user to derive better metrics to score the models and/or refine the underlying probability models (e.g., the initial Poisson model). In one embodiment, the user can see and adjust the likelihood threshold 613 and the sliding window 615 using the inputs 617 and 619, respectively, to see the traits and features of the detection process in "motion."

Following the example of road segment ABC as described above with respect to FIGS. 2A-2D, the number of observed probe activity on the road segment ABC (e.g., a vehicle 113 passing or arriving at a point) is depicted along the y-axis and each instance or interval of time that probe activity is observed is depicted along the x-axis. By way of example, the interval of time can depend on the type of road and/or the nature of the signal and may be as short as a few minutes or as long as a week or more. In this example, the system 100 computed that the normal road activity from historical data is 8.833, as shown by the baseline 621. In one embodiment, because the primary objective is to detect a road closure, the system 100 can augment the probe activity above the baseline 621 (e.g., counts 1, 2, 4, 5, 8, 9, 10, and 12) to match the expected distribution, as shown by the ghosted portion of the dashboard 611. In one embodiment, the system 100 calculates the probability of the observed probe activity below the baseline 621 (e.g., counts 3, 6, 7, and 11) based on the a statistical or probability distribution model (e.g., using a Poisson distribution or a Gaussian approximation of the Poisson distribution). In this instance, the probabilities are calculated by the system 100 based on the Poisson distribution and the respective probabilities of the counts 3, 6, 7, and 11 are as follows: 12.138%, 13.403%, 9.619%, and 3.698%.

In one embodiment, the system 100 can determine that a road segment that has less activity than the expected value may still be open if the probability of the probe activity is greater than a threshold 613 (e.g., counts 3 and 6) and closed if the probability of the probe activity is less than the threshold 613 (e.g., counts 7 and 11). In this example, the system 100 determined threshold at 7. As previously mentioned, in one embodiment, the system 100 can optimize the threshold 613 for the road graph, probe data, severity of the closure, or a combination thereof. In one instance, the user can optimize or modify the threshold 613 by using the input 617. In one embodiment, the system 100 can determine a small set of recent measurements that describe the latest road activity (e.g., the sliding window 615). In this example, the counts 3, 6, and 7 are within the sliding window 615 and the count 11 falls outside (i.e., count 11 may be an outlier). With respect to the counts that are within the sliding window 615 the system 100 can determine that 2 of the 3 are above the threshold 613. Therefore, the system 100 can conclude that the road segment ABC is open. However, if the sliding window 615 instead included the counts 6, 7, and 11, wherein 2 of the 3 counts would be below the threshold 613, then the system 100 could infer that the road segment ABC was closed. When the system 100 determines that a road segment is potentially closed, the user can use the input 623 to flag the road for further evaluation and/or verification. By viewing the different inferences reached by the system 100 through manipulation of the threshold 613 and the window 615, a user can have a better understanding of the traits and features of the detection process and the system 100 can derive better metrics to score the models once the predictions are compared against some sort of ground truth (e.g., a human verified closure).

Returning to FIG. 1, in one embodiment, the traffic platform 111 has connectivity over a communication network 119 to other components of the system 100 including but not limited to the services platform 103, services 105, content providers 107, geographic database 109, vehicles 113 (e.g., probes), and client terminal 115. By way of example, the services 105 may also be other third-party services and include traffic incident services (e.g., to report road closures), mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 111 uses the output (e.g. flagged road segments) of the traffic platform 111 to provide services such as navigation, mapping, other location-based services, etc.

In one embodiment, the traffic platform 111 may be a platform with multiple interconnected components. The traffic platform 111 may include multiple servers, intelligent networking devices, computing devices, components and corresponding software for providing parametric representations of lane lines. In addition, it is noted that the traffic platform 111 may be a separate entity of the system 100, a part of the services platform 103, a part of the one or more services 105, or included within the vehicle 113.

In one embodiment, the content providers 107 may provide content or data (e.g., including geographic data, parametric representations of mapped features, etc.) to the services platform 103, the services 105, the geographic database 109, the traffic platform 111, and the vehicle 113. The content provided may be any type of content, such as traffic incident content (e.g., road closure reports), map content, textual content, audio content, video content, image content, etc. In one embodiment, the content providers 107 may provide content that may aid in the detecting and classifying of road closures or other traffic incidents. In one embodiment, the content providers 107 may also store content associated with the services platform 103, services 105, geographic database 109, traffic platform 111, and/or vehicle 113. In another embodiment, the content providers 107 may manage access to a central repository of data, and offer a consistent, standard interface to data, such as a repository of the geographic database 109.

In one embodiment, the vehicles 113, for instance, are part of a probe-based system for collecting probe data for detecting traffic incidents and/or measuring traffic conditions in a road network. In one embodiment, each vehicle 113 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include sensors 121a-121k (also collectively referred to herein as sensors 121) for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to calculate or construct vehicle paths of a vehicle 113 over a stretch of road (e.g., over a closure link graph).

The probe points can be reported from the vehicles 113 in real-time, in batches, continuously, or at any other frequency requested by the system 100 over, for instance, the communication network 119 for processing by the traffic platform 111. The probe points also can be mapped to specific road links stored in the geographic database 101. In one embodiment, the system 100 (e.g., via the traffic platform 111) can generate probe traces (e.g., vehicle paths or trajectories) from the probe points for an individual probe so that the probe traces represent a travel trajectory or vehicle path of the probe through the road network.

In one embodiment, the vehicle 113 is configured with various sensors 121 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for evaluating road closure reports according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 121 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 113 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 113 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the services platform 103, services 105, content providers 107, traffic platform 111, vehicle 113, and/or client terminal 115 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
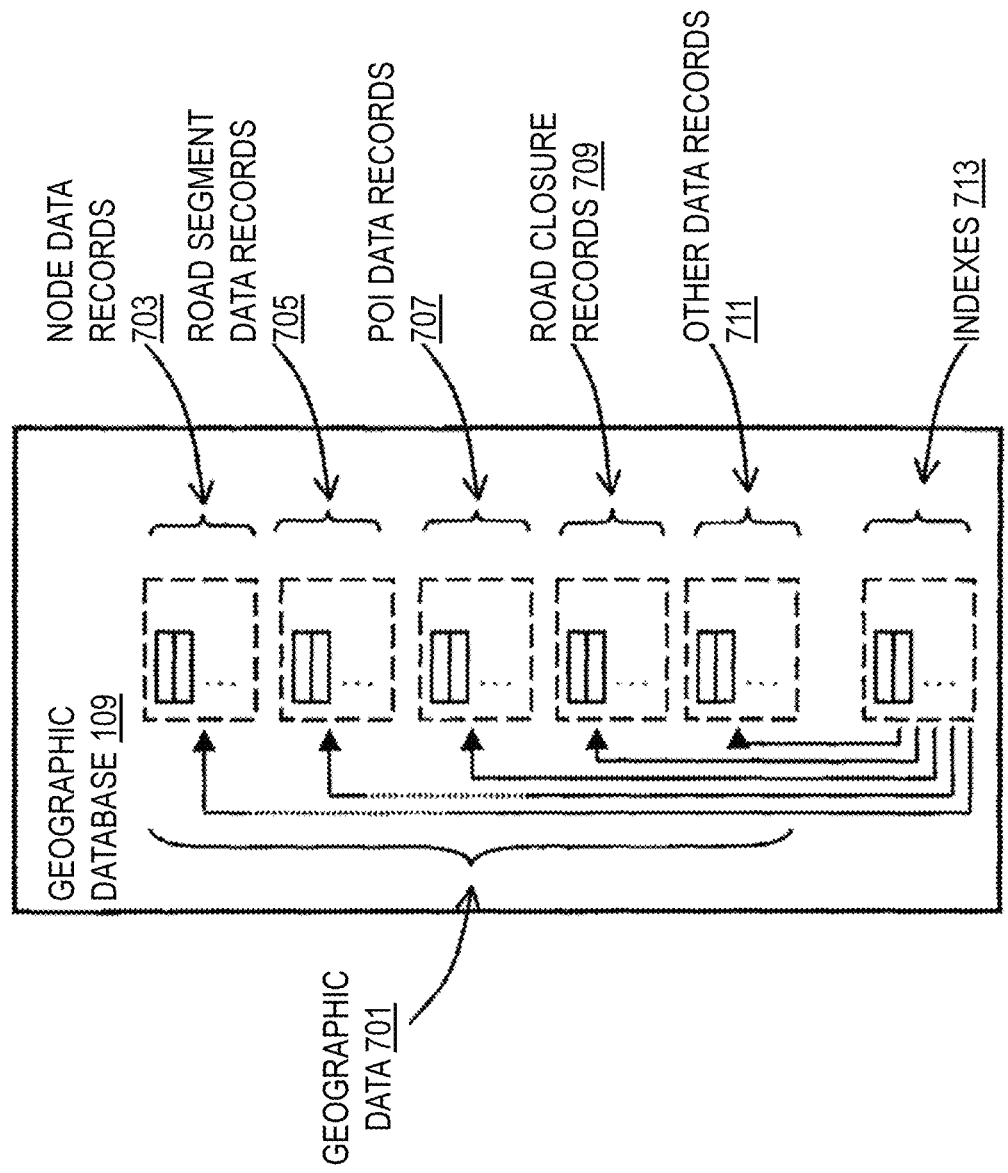
FIG. 7 is a diagram of a geographic database, according to one embodiment.

FIG. 7 is a diagram of a geographic database, according to one embodiment. In one embodiment, the geographic database 109 includes geographic data 701 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 703, road segment or link data records 705, POI data records 707, road closure data records 709, other data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 109. In one embodiment, the indexes 713 may be used to quickly locate data without having to search every row in the geographic database 109 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 707. The geographic database 109 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 109 includes the road closure data records 709 for storing predicted road closure reports, road closure evaluations, road closure link graphs, associated probe data/vehicle paths, extracted features derived from the probe data, and/or any other related data. The road closure data records 709 comprise of the road closure data layer 117 that store the road closure detections, flags, labels, and/or a combination thereof generated according to the various embodiments described herein. The road closure data layer 117 can be provided to other system components or end users to provided related mapping, navigation, and/or other location-based services. In one embodiment, the road closure data records 709 can be associated with segments of a road link (as opposed to an entire link). It is noted that the segmentation of the road for the purposes of physical divider prediction can be different than the road link structure of the geographic database 109. In other words, the segments can further subdivide the links of the geographic database 109 into smaller segments (e.g., of uniform lengths such as 5-meters). In this way, road closures or other traffic incidents can be predicted and represented at a level of granularity that is independent of the granularity or at which the actual road or road network is represented in the geographic database 109. In one embodiment, the road closure data records 709 can be associated with one or more of the node records 703, road segment or link records 705, and/or POI data records 707; or portions thereof (e.g., smaller or different segments than indicated in the road segment records 705) to provide situational awareness to drivers and provide for safer autonomous operation of vehicles.

In one embodiment, the geographic database 109 can be maintained by the content provider 107 in association with the services platform 103 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting road closures programmatically by monitoring probe activity may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
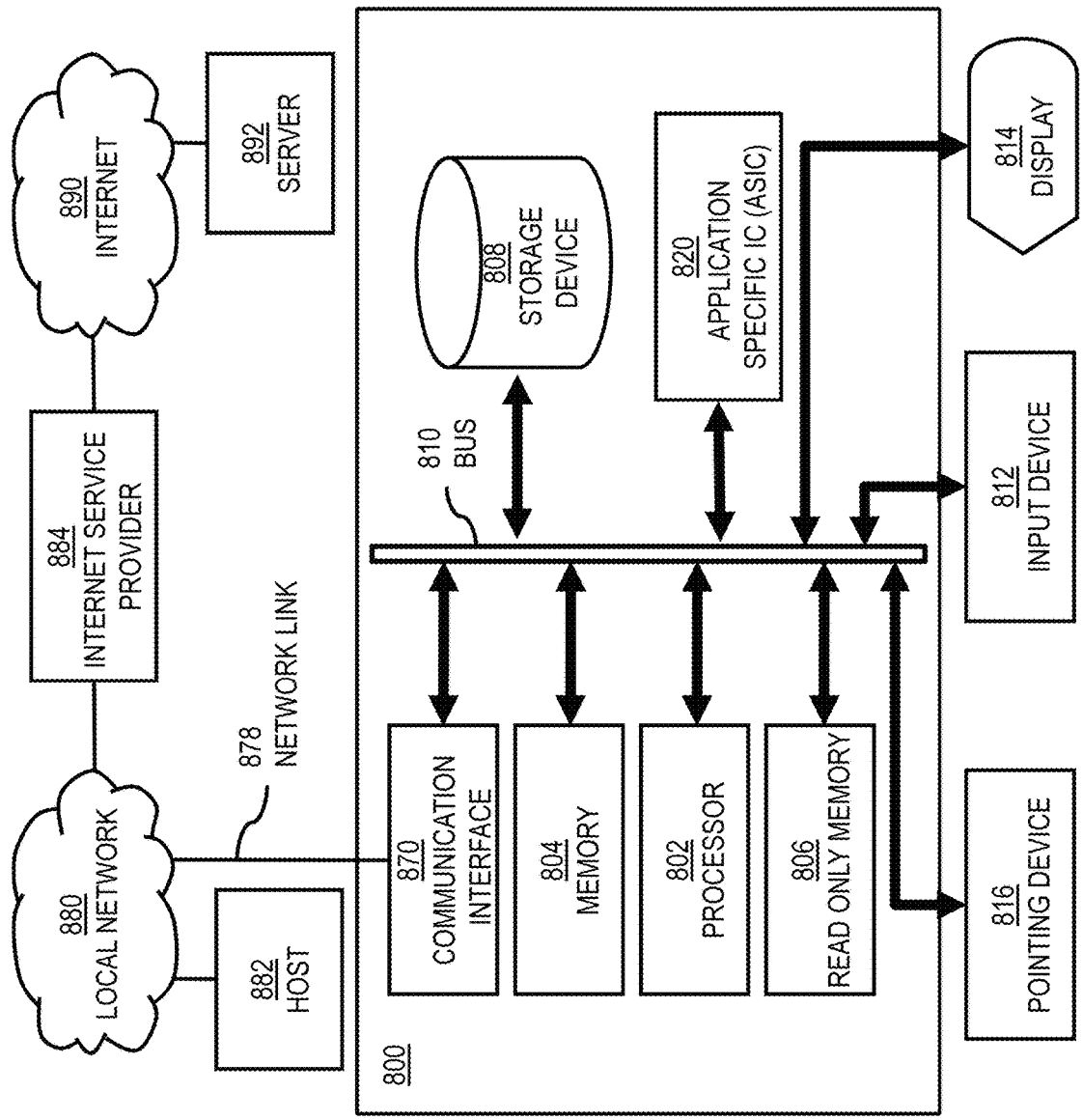
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to detect road closures programmatically by monitoring probe activity as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions.

For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to detecting road closures programmatically by monitoring probe activity. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for detecting road closures programmatically by monitoring probe activity. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for detecting road closures programmatically by monitoring probe activity, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input (i.e., programmatically), one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 119 for detecting road closures programmatically by monitoring probe activity.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to detect road closures programmatically by monitoring probe activity as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to detect road closures programmatically by monitoring probe activity. The memory 905 also stores the data associated with or generated by the execution of the inventive steps.

Figure 10:
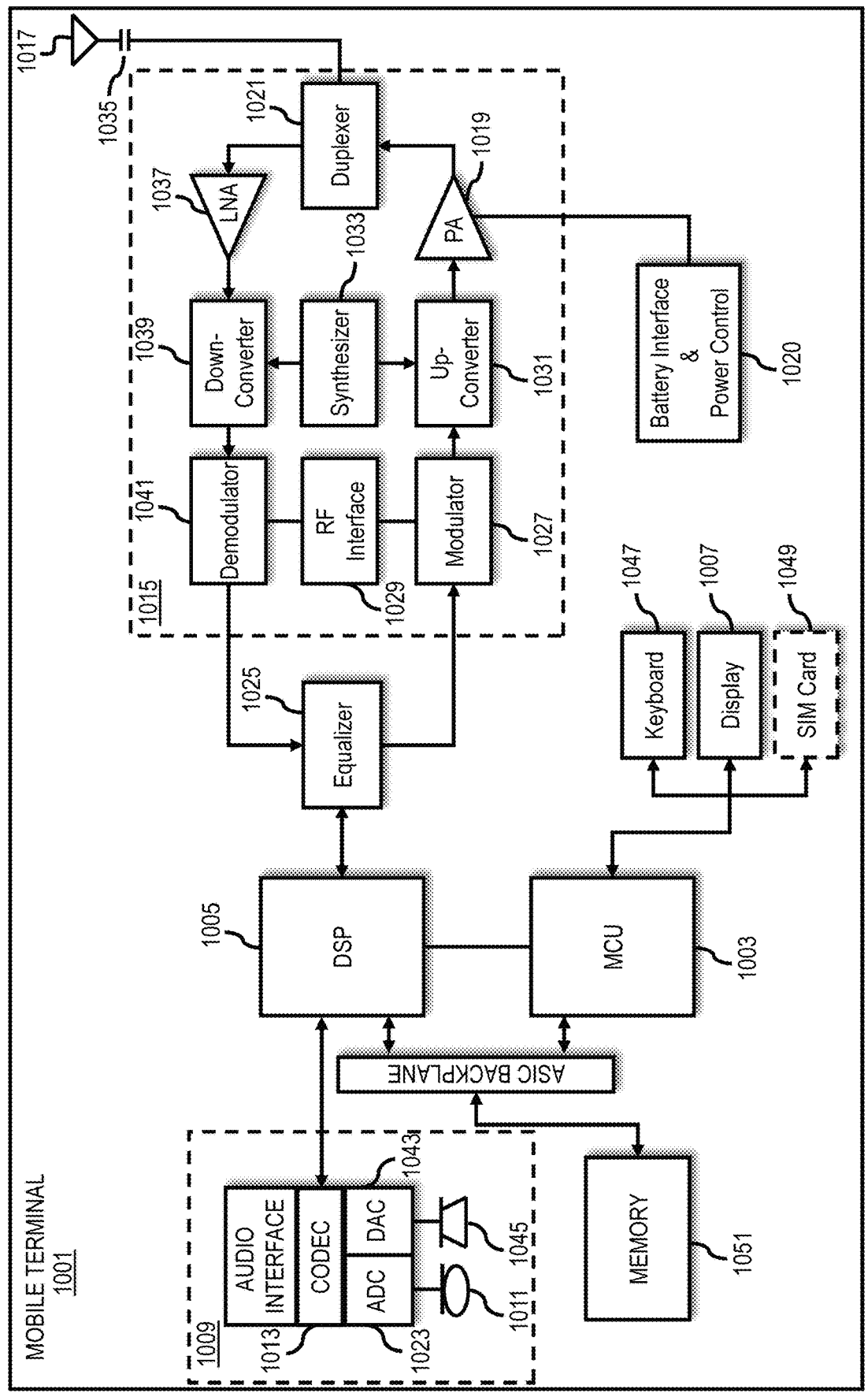
FIG. 10 is a diagram of a mobile terminal (e.g., handset or vehicle or part thereof) that can be used to implement an embodiment.

FIG. 10 is a diagram of exemplary components of a mobile terminal 1001 (e.g., a component associated with or embedded in the vehicle 113) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to detect road closures programmatically by monitoring probe activity. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for determining a closure status of a road segment based on probe data comprising:
   generating a historical model of expected probe activity on the road segment based on historical probe data;
   monitoring observed probe activity from the road segment, wherein the expected and observed probe activity include at least a probe volume on the road segment;
   calculating a probability of the observed probe activity based on the historical model of the expected probe activity;
   determining, in real-time or substantially real-time, the closure status of the road segment based on the probability; and
   providing data regarding the closure status of the road segment to a user device or service provider.

2. The method of claim 1, wherein the closure status is classified as open based on determining that the probability is greater than a probability threshold, and wherein the closure status is classified as closed based on determining that the probability is less than the probability threshold.

3. The method of claim 2, wherein the probability threshold, one or more parameters of the historical model, or a combination thereof is determined based on ground truth data comprising labeled closure status data.

4. The method of claim 1, wherein the historical model is based on a Poisson distribution, a Gaussian approximation of the Poisson distribution, or a combination thereof.

5. The method of claim 1, wherein the observed probe activity is monitored over a most recent predetermined time period.

6. The method of claim 1, further comprising:
   generating a closure model for the road segment, wherein the closure model indicates no probe activity or probe activity below a closure threshold on the road segment;
   determining a time interval for which a logarithm of a likelihood ratio between the closure model and the historical model is a minimum; and
   designating a beginning of such time interval as a change point,
   wherein the change point represents a time at which the road segment transitioned between an open state to a closed state, or between the closed state and the open state.

7. The method of claim 6, wherein the closure status of the road segment is confirmed based on the change point.

8. The method of claim 6, further comprising:
   calculating another probability of the observed probe activity based on the closure model;
   classifying the closure status of the road segment as the open state based on determining the another probability is below a probability threshold.

9. The method of claim 1, wherein the calculating of the probability of the observed probe activity and the determining of the closure status of the road segment are initiated based on determining that the observed probe activity is less than a baseline probe activity level.

10. The method of claim 9, wherein the closure status of the road segment is classified as open based additionally on determining that the observed probe activity is greater than the baseline probe activity level.

11. The method of claim 1, wherein the expected and observed probe activity include the probe volume and a probe speed.

12. An apparatus for determining a closure status of a road segment based on probe data comprising:
at least one processor; and
at least one memory including computer program code for one or more programs,
the at least one memory and the computer program code configured to, with the at least one processor, cause the apparatus to perform at least the following,
determine a baseline probe activity for the road segment based on the probe data;
monitor observed probe activity from the road segment, wherein the baseline and observed probe activity include at least a probe volume on the road segment;
calculate a likelihood of the observed probe activity from the baseline probe activity;
determine, in real-time or substantially real-time, the closure status of the road segment based on the likelihood; and
provide data regarding the closure status of the road segment to a user device or service provider.

13. The apparatus of claim 12, wherein the closure status is classified as open based on determining that the probability is greater than a probability threshold, and wherein the closure status is classified as closed based on determining that the probability is less than the probability threshold.

14. The apparatus of claim 13, wherein the probability threshold, one or more parameters of the baseline probe activity, or a combination thereof is determined based on ground truth data comprising labeled closure status data.

15. The apparatus of claim 12, wherein the apparatus is further caused to:
generate a closure model for the road segment, wherein the closure model indicates no probe activity or probe activity below a closure threshold on the road segment;
determine a time interval for which a logarithm of a likelihood ratio between the closure model and the baseline probe activity is a minimum; and
designate a beginning of such time interval as a change point,
wherein the change point represents a time at which the road segment transitioned between an open state to a closed state, or between the closed state and the open state.

16. The apparatus of claim 15, wherein the closure status of the road segment is confirmed based on the change point.

17. The apparatus of claim 15, wherein the apparatus is further caused to:
calculate another probability of the observed probe activity based on the closure model;
classify the closure status of the road segment as the open state based on determining the another probability is below a probability threshold.

18. A non-transitory computer-readable storage medium for determining a closure status of a road segment based on probe data, carrying one or more sequences of one or more instructions which, when executed by one or more processors, cause an apparatus to perform:
generating a closure model for the road segment, wherein the closure model indicates no probe activity or probe activity below a closure threshold on the road segment;
monitoring observed probe activity from the road segment, wherein the observed probe activity includes at least a probe volume on the road segment;
calculating a probability of the observed probe activity based on the closure model;
determining, in real-time or substantially real-time, the closure status of the road segment based on the probability; and
providing data regarding the closure status of the road segment to a user device or service provider.

19. The non-transitory computer-readable storage medium of claim 18, wherein the closure status is classified as open based on determining that the probability is less than a probability threshold, and wherein the closure status is classified as closed based on determining that the probability is greater than the probability threshold.

20. The non-transitory computer-readable storage medium of claim 19, wherein the probability threshold, one or more parameters of the closure model, or a combination thereof is determined based on ground truth data comprising labeled closure status data.

* * * * *